United States Patent
Oshita et al.

(10) Patent No.: US 10,175,815 B2
(45) Date of Patent: Jan. 8, 2019

(54) ELECTROSTATIC INPUT DEVICE

(71) Applicant: Alps Electric Co., Ltd., Ota-ku, Tokyo (JP)

(72) Inventors: Kazuhito Oshita, Miyagi-ken (JP); Naoyuki Hatano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 85 days.

(21) Appl. No.: 15/388,872

(22) Filed: Dec. 22, 2016

(65) Prior Publication Data
US 2017/0228083 A1    Aug. 10, 2017

(30) Foreign Application Priority Data
Feb. 4, 2016    (JP) .................. 2016-019485

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 2203/04108* (2013.01)

(58) Field of Classification Search
CPC ....... G06F 3/044; G06F 3/0416; G06F 3/0418
See application file for complete search history.

(56) References Cited

U.S. PATENT DOCUMENTS

| | | | |
|---|---|---|---|
| 2011/0069021 A1* | 3/2011 | Hill | G06F 3/0416 345/173 |
| 2015/0035795 A1 | 2/2015 | Oshita et al. | |
| 2015/0346903 A1* | 12/2015 | O'Connor | G09G 5/003 345/173 |
| 2016/0179250 A1* | 6/2016 | Nakajima | G06F 3/044 345/174 |
| 2016/0266674 A1* | 9/2016 | Schropp, Jr. | G06F 3/0488 |
| 2017/0177110 A1* | 6/2017 | Winebrand | G06F 3/044 |

FOREIGN PATENT DOCUMENTS

JP    2015-32177    2/2015

* cited by examiner

*Primary Examiner* — Yuzhen Shen
(74) *Attorney, Agent, or Firm* — Beyer Law Group LLP (57) ABSTRACT

There is provided an electrostatic input device including a plurality of electrodes, and receiving an input operation according to electrostatic capacitances generated between the plurality of electrodes and an object when the object comes close to a detection surface, the device including a variation detection unit configured to detect variations in the electrostatic capacitances, a determination unit configured to determine whether the object coming close to the detection surface is the fingertip or the palm on the basis of the variations detected by the variation detection unit, and a control unit configured to inhibit reception of an input operation on the detection surface for a predetermined period of time in a case where the determination unit determines that the object coming close to the detection surface is the palm.

5 Claims, 4 Drawing Sheets

ELECTROSTATIC INPUT DEVICE

CLAIM OF PRIORITY

This application claims benefit of Japanese Patent Application No. 2016-019485 filed on Feb. 4, 2016 which is hereby incorporated by reference.

BACKGROUND OF THE INVENTION

1. Field of the Invention

The present invention relates to a touch pad mounted on a notebook PC or the like.

2. Description of the Related Art

A touch pad is generally mounted on a notebook PC as a kind of pointing device. A user can operate a mouse pointer by tracing the touch pad with the finger. In recent years, a size of such a touch pad has been increased, and thus the palm easily comes into contact with the touch pad when a keyboard is operated. Thus, an operation error easily occurs.

Therefore, the following touch pad has been proposed. That is, in a case where a contact position is a peripheral portion on which the palm is frequently placed, it is determined that a contact region is formed by the palm if spatial characteristics (an area and an aspect ratio) corresponding to an area and a length of the contact region exceed a first condition corresponding to a predetermined area and length, and it is determined that the contact region is formed by the fingertip if the spatial characteristics do not exceed the first condition. In a case where a contact position is a central portion on which the fingertip is frequently placed, it is determined that a contact region is formed by the palm if the spatial characteristics exceed a second condition corresponding to an area and a length larger than the first condition, and it is determined that the contact region is formed by the fingertip if the spatial characteristics do not exceed the second condition.

Japanese Unexamined Patent Application Publication No. 2015-32177 is an example of the related art.

As mentioned above, in the related art, there is a need for a touch pad which can effectively prevent an operation error caused by the palm and allows a normal operation using the fingertip to be smoothly performed.

SUMMARY OF THE INVENTION

The present invention provides an electrostatic input device and a program for the electrostatic input device, capable of effectively preventing an operation error caused by the palm and allowing a normal operation using the fingertip to be smoothly performed.

According to an aspect of the present invention, there is provided an electrostatic input device including a plurality of electrodes, and receiving an input operation according to electrostatic capacitances generated between the plurality of electrodes and an object when the object comes close to a detection surface, the device including a variation detection unit configured to detect variations in the electrostatic capacitances; a determination unit configured to determine whether the object coming close to the detection surface is the fingertip or the palm on the basis of the variations detected by the variation detection unit; and a control unit configured to inhibit reception of an input operation on the detection surface for a predetermined period of time in a case where the determination unit determines that the object coming close to the detection surface is the palm.

According to the configuration, the electrostatic input device includes the variation detection unit that detects variations in the electrostatic capacitances, the determination unit that determines whether the object coming close to the detection surface is the fingertip or the palm on the basis of the variations detected by the variation detection unit, and the control unit that inhibits reception of an input operation on the detection surface for a predetermined period of time in a case where the determination unit determines that the object coming close to the detection surface is the palm. Therefore, since an input operation using the palm is inhibited in a case where it is determined that an object coming close to the detection surface is the palm, it is possible to effectively prevent an operation error caused by the palm, and also to smoothly perform a normal operation using the fingertip. In a case where a determination is performed on the basis of only a contact state (an area, a length, or the like of a contact region), if the palm comes into slight contact with the detection surface, the palm cannot be discriminated from the finger. In a case where a determination is performed on the basis of a proximity state, discrimination accuracy between a large object and a small object is improved (in a case where a determination is also performed on the basis of integration, discrimination accuracy is further improved).

According to the aspect of the present invention, preferably, the determination unit determines that the object coming close to the detection surface is the palm if an integrated value of variations corresponding to a plurality of electrodes in a specific region of the detection surface, detected by the variation detection unit, exceeds a first threshold value.

In a case where the palm does not come into contact with the detection surface, detection is difficult since variations in electrostatic capacitances corresponding to the electrodes are very small. However, according to the configuration, there is the use of an integrated value of variations corresponding to a plurality of electrodes in the specific regions of the detection surface, detected by the variation detection unit. Therefore, even in a case where the palm does not come into contact with the detection surface, and thus variations in electrostatic capacitances corresponding to the electrodes are very small, it is possible to determine that the palm comes close to the detection surface. Thus, it is possible to effectively prevent an operation error caused by the palm, and also to smoothly perform a normal operation using the fingertip. Since the palm is larger than the finger, it is possible to determine that the palm comes close to the detection surface by using an integrated value in the region even if a variation in an each electrostatic capacitance is small.

According to the aspect of the present invention, preferably, the determination unit determines that the object coming close to the detection surface is the palm if a movement average value of an integrated value of variations corresponding to a plurality of electrodes in a specific region of the detection surface, detected by the variation detection unit, exceeds a second threshold value.

According to the configuration, since it is determined that an object coming close to the detection surface is the palm by using the movement average value of the integrated value, it is possible to reduce the influence of noise such as a sudden increase or decrease in an integrated value. Consequently, it is possible to more accurately determine that the palm comes close to the detection surface.

According to the aspect of the present invention, preferably, the control unit inhibits reception of an input operation on an inhibition region of the detection surface for a predetermined period of time in a case where the determination unit determines that the object coming close to the detection surface is the palm.

According to the configuration, in a case where it is determined that an object coming close to the detection surface is the palm, it is possible to inhibit reception of an input operation on a region with which the palm easily comes into contact. Thus, it is possible to smoothly perform a normal operation using the fingertip.

According to the aspect of the present invention, preferably, the control unit cancels inhibition of an input operation on the detection surface in a case where an input operation is performed on regions other than the inhibition region.

According to the configuration, in a case where an input operation is performed on regions other than the specific region, there is a high probability that the operation may be performed with the finger, and thus it is possible to smoothly perform a normal operation using the fingertip by canceling the inhibition of an input operation on the specific region.

According to the aspect of the present invention, preferably, the control unit sets the specific region at an end of the detection surface.

According to the configuration, since the specific region is set the end of the detection surface with which the palm easily comes into contact, and thus it is possible to more effectively prevent an operation error caused by the palm.

According to the aspect of the present invention, preferably, the control unit sets a plurality of the specific regions on the detection surface.

According to the configuration, since a plurality of specific regions are set on the detection surface, it is possible to effectively prevent an operation error caused by the palm at the upper end or the left and right ends of the detection surface with which the palm easily comes into contact.

According to the aspect of the present invention, preferably, the control unit performs a process of inhibiting reception of an input operation on an inhibition region of the detection surface for a predetermined period of time for each of the plurality of set specific regions.

According to the configuration, since a plurality of specific regions are set on the detection surface, it is possible to effectively prevent an operation error caused by the palm at the upper end or the left and right ends of the detection surface with which the palm easily comes into contact.

According to another aspect of the present invention, there is provided a program for an electrostatic input device which includes a plurality of electrodes, and receives an input operation according to electrostatic capacitances generated between the plurality of electrodes and an object when the object comes close to a detection surface, the program causing the electrostatic input device to execute a step of detecting variations in the electrostatic capacitances; a step of determining whether the object coming close to the detection surface is the fingertip or the palm on the basis of the detected variations; and a step of inhibiting reception of an input operation on the detection surface for a predetermined period of time in a case where it is determined that the object coming close to the detection surface is the palm.

According to configuration, the program causes the electrostatic input device to execute a step of detecting variations in the electrostatic capacitances; a step of determining whether the object coming close to the detection surface is the fingertip or the palm on the basis of the detected variations; and a step of inhibiting reception of an input operation on the detection surface for a predetermined period of time in a case where it is determined by a determination unit that the object coming close to the detection surface is the palm. Therefore, since an input operation using the palm is inhibited in a case where it is determined that an object coming close to the detection surface is the palm, it is possible to effectively prevent an operation error caused by the palm, and also to smoothly perform a normal operation using the fingertip.

According to the electrostatic input device and the program for the electrostatic input device of the aspects of the present invention, it is possible to effectively prevent an operation error caused by the palm and to smoothly perform a normal operation using the fingertip.

DESCRIPTION OF THE PREFERRED EMBODIMENTS

Embodiment

Figure 1:
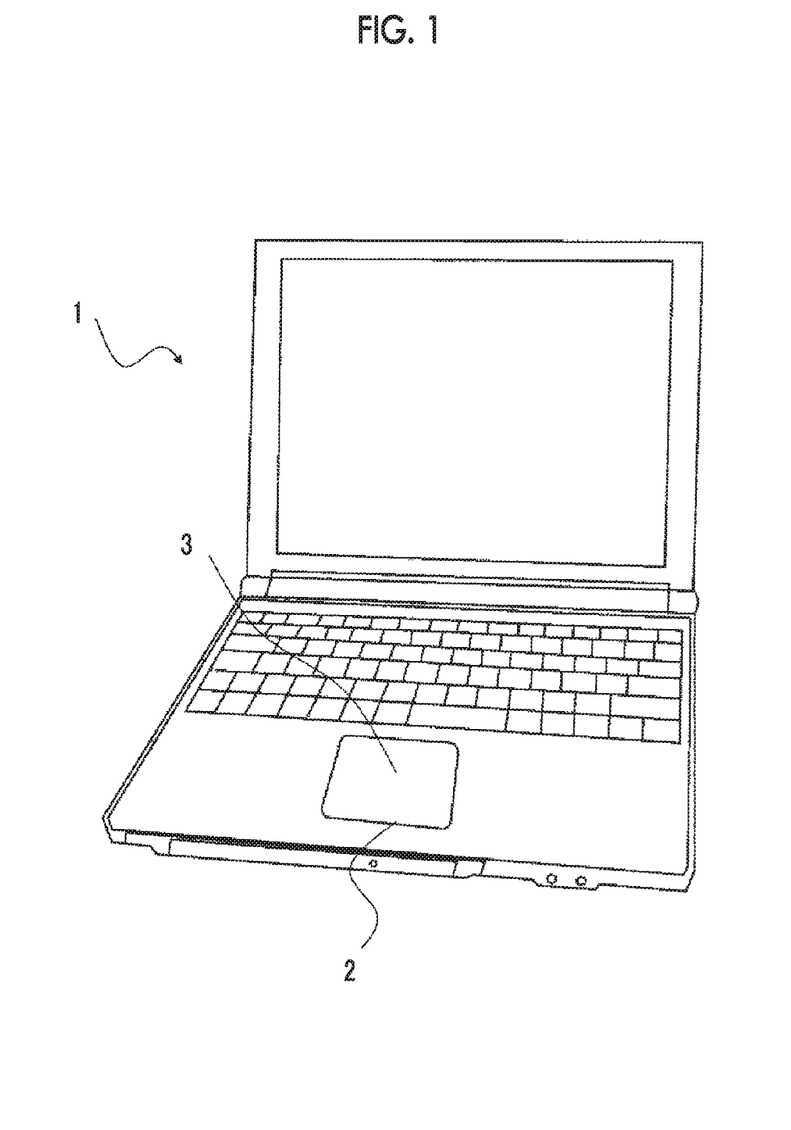
FIG. 1 illustrates a state in which an electrostatic input device according to an embodiment of the present invention is mounted on a notebook PC.
Figure 2:
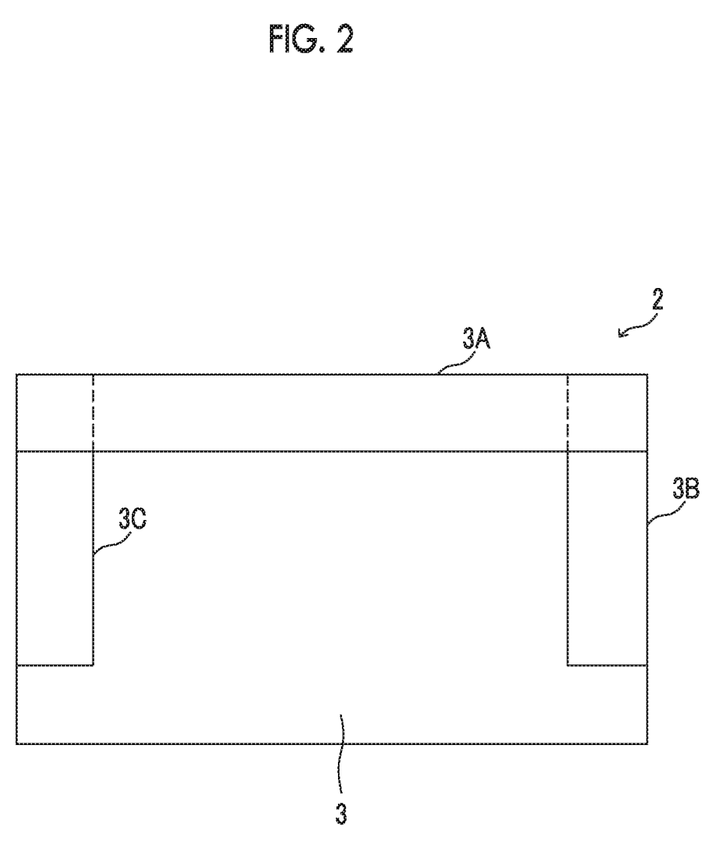
FIG. 2 is a system configuration diagram of the electrostatic input device according to the embodiment of the present invention.
Figure 3:
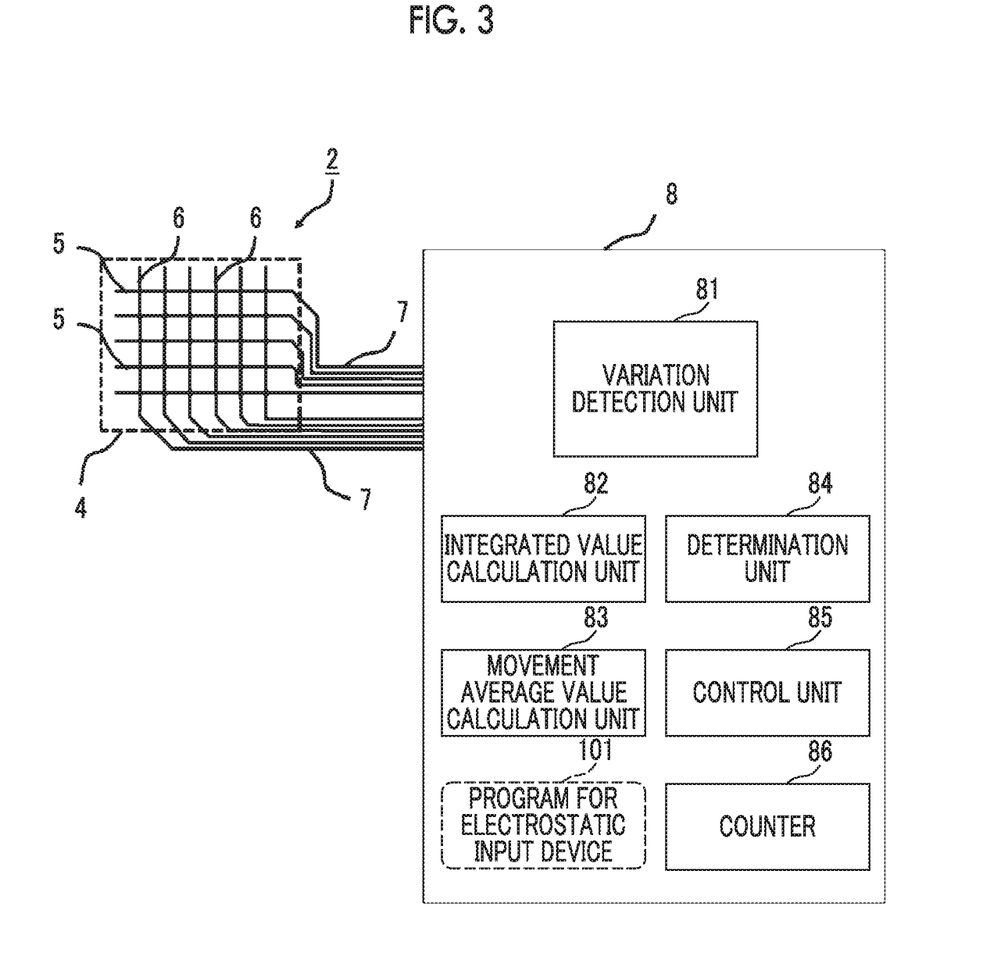
FIG. 3 is a plan view of the electrostatic input device according to the embodiment of the present invention.

FIG. 1 is a diagram illustrating a state in which an electrostatic input device 2 according to an embodiment is mounted on a notebook PC 1. FIG. 2 is a plan view of the electrostatic input device 2 according to the embodiment. FIG. 3 is a system configuration diagram of the electrostatic input device 2 according to the embodiment. Hereinafter, with reference to FIGS. 1 to 3, a description will be made of the electrostatic input device 2 according to the embodiment.

The electrostatic input device 2 is, for example, a touch pad, and is mounted on the notebook PC 1 as illustrated in FIG. 1. An operation plate is bonded to the uppermost surface of the electrostatic input device 2, and a surface of the operation plate is a detection surface 3 for detecting an operation performed by a user.

As illustrated in FIG. 2, a plurality of specific regions 3A to 3C are set on the detection surface 3. Here, the specific regions 3A to 3C are set at ends of the detection surface 3 with which the palm easily comes into contact during an input operation on a keyboard illustrated in FIG. 1 or the detection surface 3. The specific regions 3A to 3C are set at the ends of the detection surface 3 with which the palm easily comes into contact, and thus it is possible to effectively prevent an operation error due to contact or proximity of the palm.

In the present embodiment, in FIG. 2, the specific region 3A is set at the upper end of the detection surface 3, the specific region 3B is set at the right end of the detection surface 3, and the specific region 3C is set at the left end of the detection surface 3. However, setting of specific regions is not limited to the example illustrated in FIG. 2, and only one specific region may be set on the detection surface 3, and four or more specific regions may be set on the detection surface 3. A specific region may be set at locations other than the ends of the detection surface 3. The specific regions 3A to 3C are set on the detection surface 3 by control means 8 which will be described later, and are not separate physically.

As illustrated in FIG. 3, the electrostatic input device 2 includes a group of a plurality of X electrodes 5 and a group of a plurality of Y electrodes 6 provided on a substrate 4, and the electrodes are connected to the control means 8 via wirings 7. The control means 8 applies a voltage to one of the X electrode group 5 or the Y electrode group 6 as driving electrodes, detects the voltage with the other group as detection electrodes, and detects a variation in an electrostatic capacitance obtained when the finger or the palm comes close to the substrate 4, so as to detect the proximity of the palm. The X electrodes 5 and the Y electrodes 6 of the present embodiment are detection means for outputting a voltage converted into an electrostatic capacitance value, but are not limited thereto, and may be, for example, of a type of detecting and outputting other variations in an operation pressure or the like during an operation of a touch pad.

As illustrated in FIG. 3, the control means 8 includes a variation detection unit 81, an integrated value calculation unit 82, a movement average value calculation unit 83, a determination unit 84, a control unit 85, and a counter 86. The variation detection unit 81 detects variations in electrostatic capacitances of the X electrodes 5 and the Y electrodes 6. The integrated value calculation unit 82 calculates an integrated value of variations corresponding to the plurality of electrodes in the specific regions 3A to 3C of the detection surface 3, detected by the variation detection unit 81, for each of the specific regions 3A to 3C.

The control means 8 is, for example, a microcomputer, and realizes functions of at least some of the variation detection unit 81, the integrated value calculation unit 82, the movement average value calculation unit 83, the determination unit 84, the control unit 85, and the counter 86 illustrated in FIG. 3 by executing a program 101 for the electrostatic input device.

The movement average value calculation unit 83 calculates a movement average value (which is a movement average value in a time axis) of the integrated value calculated for each of the specific regions 3A to 3C by the integrated value calculation unit 82, for each of the specific regions 3A to 3C. The movement average value calculation unit 83 of the present embodiment calculates the movement average value of the integrated value calculated for each of the specific regions 3A to 3C by using a simple movement average, but may calculate the movement average value of the integrated value calculated for each of the specific regions 3A to 3C by using a weighted movement average or an index movement average.

The determination unit 84 determines whether or not there is a touch operation on the detection surface 3. The determination unit 84 determines whether an object approaching the detection surface 3 is the fingertip or the palm on the basis of variations detected by the variation detection unit 81. Specifically, the determination unit 84 compares the movement average values calculated for the respective specific regions 3A to 3C by the movement average value calculation unit 83 with threshold values A to C (second threshold values) set in the specific regions 3A to 3C.

The determination unit 84 determines that the approaching object is the palm in a case where the respective movement average values for the specific regions 3A to 3C exceed the corresponding threshold values A to C as comparison results, and determines that the approaching object is the fingertip, and determines that the approaching object in a case where the respective movement average values do not exceed the corresponding threshold values A to C.

For example, in a case where the movement average value for the specific region 3A exceeds the corresponding threshold value A as a comparison result, the determination unit 84 determines that the palms comes close to the specific region 3A. Similarly, in a case where the movement average value for the specific region 3B exceeds the corresponding threshold value B, the determination unit 84 determines that the palms comes close to the specific region 3B. Further, in a case where the movement average value for the specific region 3C exceeds the corresponding threshold value C, the determination unit 84 determines that the palms comes close to the specific region 3C.

The control unit 85 sets the specific regions 3A to 3C described in FIG. 2 at the ends of the detection surface 3. In a case where the determination unit 84 determines that an object coming close to the detection surface 3 is the palm, the control unit 85 inhibits reception of an input operation on the detection surface 3.

Specifically, in a case where the determination unit 84 determines that an object approaching the detection surface 3 is the palm, the control unit 85 inhibits reception of an input operation on a region in which the approaching object is the palm for a predetermined period of time. Here, the control unit 85 separately performs the inhibition of reception of an input operation on a specific region for a predetermined period of time for each of the specific regions 3A to 3C.

In other words, in a case where the determination unit 84 determines that the palm comes close to the specific region 3A, the control unit 85 inhibits reception of an input operation on the specific region 3A for a predetermined period of time. In a case where the determination unit 84 determines that the palm comes close to the specific region 3B, the control unit 85 inhibits reception of an input operation on the specific region 3B for a predetermined period of time. Further, in a case where the determination unit 84 determines that the palm comes close to the specific region 3C, the control unit 85 inhibits reception of an input operation on the specific region 3C for a predetermined period of time.

Regions (inhibition regions) on which an input operation is inhibited are not limited to the specific regions 3A to 3C, and specific regions (detection region) may not necessarily be the same as inhibition regions (regions on which an input operation is inhibited). For example, an area of detection regions (specific regions) is larger than that of inhibition regions, and partial sizes thereof may be different from each other. Such regions are adjusted as appropriate depending on the proximity detection sensitivity or the like.

In a case where an input operation on regions other than a specific region to which the palm is determined as coming close in the detection surface 3 is performed when reception of an input operation is inhibited, the control unit 85 cancels the inhibition of an input operation on the specific region to which the palm is determined as coming close. The control unit 85 controls an operation of the counter 86.

The counter 86 measures time in response to an instruction from the control unit 85. Different values may be set for the respective specific regions as input operation reception inhibition time.

Figure 4:
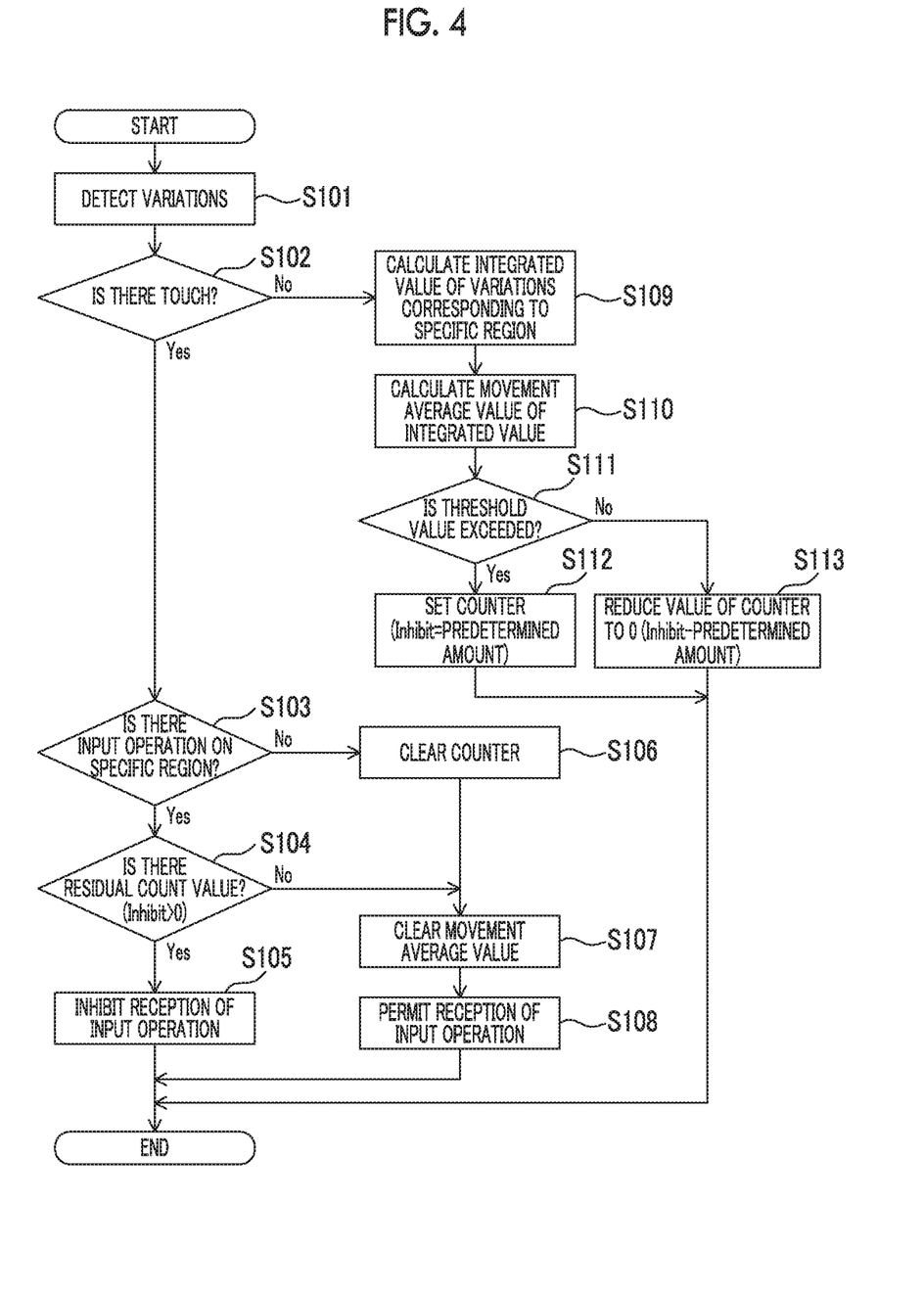
FIG. 4 is a flowchart for explaining an operation of the electrostatic input device according to the embodiment of the present invention.

FIG. 4 is a flowchart for explaining an operation of the electrostatic input device 2 according to the embodiment. Hereinafter, with reference to FIGS. 1 to 4, a description will be made of the operation of the electrostatic input device 2 according to the embodiment. In the operation illustrated in the flowchart of FIG. 4, if a cycle from starting to ending is completed, the next cycle is executed from starting.

First, the variation detection unit 81 detects variations in electrostatic capacitances corresponding to the X electrodes 5 and the Y electrodes 6 (step S101). Next, the determination unit 84 determines whether or not there is a touch on the detection surface 3 (step S102), and determines whether or not the touch is an input operation on the specific regions 3A to 3C (step S103) if there is the touch (Yes in step S102). If the touch is an input operation on the specific regions 3A to 3C (Yes in step S103), the determination unit 84 determines whether or not there is a residual count value in the counter measuring the input operation reception inhibition time (step S104).

In a case where there is the residual count value (Yes in step S104), the control unit 85 inhibits reception of an input operation (step S105). In a case where the touch is not an input operation on the specific regions 3A to 3C (No in step S103), the control unit 85 clears the counter (sets the counter to 0) (step S106). Next, the control unit 85 clears movement average values (sets the movement average values to 0) (step S107), and permits reception of an input operation (step S108). In a case where there is no residual count value (No in step S104), the control unit 85 clears movement average values (sets the movement average values to 0) (step S107), and permits reception of an input operation (step S108).

In a case where there is no touch (No in step S102), the integrated value calculation unit 82 calculates integrated values of variations corresponding to a plurality of electrodes in the specific regions 3A to 3C of the detection surface 3, detected by the variation detection unit 81, for the respective specific regions 3A to 3C (step S109). Next, the movement average value calculation unit 83 calculates movement average values of the integrated values calculated for the respective specific regions 3A to 3C by the integrated value calculation unit 82, for the respective specific regions 3A to 3C (step S110).

Next, the determination unit 84 determines whether an object coming close to the detection surface 3 is the fingertip or the palm on the basis of the variations detected by the variation detection unit 81. Specifically, the determination unit 84 compares the movement average values calculated for the respective specific regions 3A to 3C by the movement average value calculation unit 83 with threshold values A to C (second threshold values) set in the specific regions 3A to 3C (step S111).

In a case where the respective movement average values for the specific regions 3A to 3C exceed the corresponding threshold values A to C (Yes in step S111), the determination unit 84 determines that the palm comes close, and the control unit 85 sets the counter to, for example, 500 msec (step S112). The value of the counter corresponds to the input operation reception inhibition time. In a case where the respective movement average values do not exceed the corresponding threshold values A to C (No in step S111), the control unit 85 reduces a value of the counter to 0 (for example, 8 msec) in accordance with the elapsed time (step S113).

As mentioned above, the electrostatic input device 2 according to the present embodiment includes a plurality of electrodes 5 and 6, receives an input operation according to electrostatic capacitances generated between the plurality of electrodes 5 and 6 and an object when the object comes close to the detection surface 3, and includes the variation detection unit 81 that detects variations in the electrostatic capacitances, the determination unit 84 that determines whether the object coming close to the detection surface 3 is the fingertip or the palm on the basis of the variations detected by the variation detection unit 81, and the control unit 85 that inhibits reception of an input operation on the detection surface 3 for a predetermined period of time in a case where the determination unit 84 determines that the object coming close to the detection surface 3 is the palm. Since an input operation is inhibited in a case where an object coming close to the detection surface is the palm, it is possible to effectively prevent an operation error caused by the palm, and also to smoothly perform a normal operation using the fingertip. In a case where a determination is performed on the basis of a contact state (an area, a length, or the like), if the palm comes into slight contact with the detection surface, the palm cannot be discriminated from the finger. In a case where a determination is performed on the basis of a proximity state, discrimination accuracy between a large object and a small object is improved (in a case where a determination is performed on the basis of integration, discrimination accuracy is further improved).

The electrostatic input device 2 according to the present embodiment further includes the integrated value calculation unit 82 that calculates movement average values of integrated values calculated for the respective specific regions 3A to 3C, for the respective specific regions 3A to 3C. In a case where the palm does not come into contact with the detection surface, detection is difficult since variations in electrostatic capacitances corresponding to the electrodes are very small, but there is provided the integrated value calculation unit 82 which calculates integrated values of variations corresponding to a plurality of electrodes in the specific regions of the detection surface, detected by the variation detection unit 81. Therefore, even in a case where the palm does not come into contact with the detection surface, and thus variations in electrostatic capacitances corresponding to the electrodes are very small, it is possible to determine that the palm comes close to the detection surface. Thus, it is possible to effectively prevent an operation error caused by the palm, and also to smoothly perform a normal operation using the fingertip. Since the palm is larger than the finger, it is possible to determine that the palm comes close to the detection surface by using an integrated value in the region even if a variation in an each electrostatic capacitance is small.

The electrostatic input device 2 according to the present embodiment further includes the movement average value calculation unit 83 that calculates movement average values of the integrated values calculated for the respective specific regions 3A to 3C by the integrated value calculation unit 82, for the respective specific regions 3A to 3C. Therefore, it is possible to determine that an object coming close to the detection surface is the palm by using the movement average values of the integrated values calculated by the integrated value calculation unit 82, and thus to reduce the influence of noise such as a sudden increase or decrease in an integrated value. Consequently, it is possible to more accurately determine that the palm comes close to the detection surface.

The control unit 85 of the electrostatic input device 2 according to the present embodiment sets a plurality of specific regions 3A to 3C at ends of the detection surface 3, and performs a process of inhibiting reception of an input operation on inhibition regions of the detection surface 3 for a predetermined period of time for the plurality of respective set specific regions 3A to 3C. In other words, since the specific regions are set the ends of the detection surface 3 with which the palm easily comes into contact, and thus it is possible to more effectively prevent an operation error caused by the palm. Since a plurality of specific regions 3A to 3C are set on the detection surface 3, it is possible to effectively prevent an operation error caused by the palm at the upper end or the left and right ends of the detection surface with which the palm easily comes into contact.

In a case where an input operation is performed on regions other than the inhibition regions to which the palm comes close in the detection surface 3, the control unit 85 of the electrostatic input device 2 according to the present embodiment cancels the inhibition of an input operation on the detection surface 3. In a case where an input operation is performed on regions other than the inhibition regions, there is a high probability that the operation may be performed with the finger, and thus it is possible to smoothly perform a normal operation using the fingertip by canceling the inhibition of an input operation on the inhibition regions through the above-described process.

Other Embodiments

The present invention is not limited the above-described embodiment. In other words, a person skilled in the art may perform various alterations, combinations, sub-combinations, and replacements in relation to the constituent elements of the above-described embodiment within the technical scope of the present invention or the equivalents thereof.

For example, in the above-described embodiment, the movement average value calculation unit 83 calculates a movement average value of integrated values, and the determination unit 84 compares the calculated movement average value with a threshold value (second threshold value), but may compare an integrated value calculated by the integrated value calculation unit 82 with a threshold value (first threshold value). In a case where a contact position is moved by a predetermined amount or larger when contact (touch) is detected in a specific region, inhibition of reception of an input operation may be canceled.

Even in a case where contact (touch) initially detected in a specific region is then moved to the outside of the contact specific region, reception of an input operation may continue to be inhibited until an initial contact position is moved by a predetermined amount or larger. In a case where a finger operation is determined according to other methods of discriminating the finger from the palm, inhibition of reception of an input operation may be canceled. At this time, inhibition of reception of an input operation may be canceled only in a case where an operation determined as the finger operation is performed on regions other than inhibition regions.

In the above-described embodiment, the specific regions 3A to 3C have been exemplified as specific regions, but a shape or a position of a specific region are not particularly limited as long as there is a probability that the palm may come close to the region during an operation. An inhibition region is not required to the same as a specific region, and, for example, an area of the detection region is larger than that of the inhibition region, and partial sizes thereof may be different from each other. Such regions are preferably adjusted as appropriate depending on the proximity detection sensitivity or the like.

It should be understood by those skilled in the art that various modifications, combinations, sub-combinations and alterations may occur depending on design requirements and other factors insofar as they are within the scope of the appended claims of the equivalents thereof.

What is claimed is:

1. An electrostatic input device comprising:
a detection surface configured to receive an input operation of an object approaching thereto, the detection surface including at least one specific region set at an end of the detection surface;
a plurality of electrodes, electrostatic capacitances being generated between the plurality of electrodes and the object when the object comes close to the detection surface; and
a microcomputer connected to the plurality of electrodes, the microcomputer:
    detecting variations in the electrostatic capacitances for the plurality of electrodes;
    determining whether or not there is a touch on the detection surface by the object;
    determining whether or not the touch is the input operation on the at least one specific region of the detection surface, if it is determined that there is the touch on the detection surface;
    permitting reception of the input operation by the detection surface if it is determined that the touch is not the input operation on the at least one specific region;
    determining whether the object coming close to the detection surface is a fingertip or a palm on the basis of the detected variations if it is determined that there is no touch on the detection surface; and
    inhibiting the reception of the input operation by the detection surface for a predetermined period of time if it is determined that there is no touch and the object coming close to the detection surface is the palm,
wherein the determining that the object coming close to the detection surface is the palm includes:
    calculating an integrated value of the variations in the electrostatic capacitances formed between the object and the plurality of electrodes for each of the at least one specific region while there is no touch on the detection surface;
    obtaining a moving average of the integrated value of the variations in the electrostatic capacitances for each of the at least one specific region; and
    determining that the object is the palm if the moving average of the integrated value exceeds a threshold value.

2. The electrostatic input device according to claim 1, wherein the microcomputer inhibits the reception of the input operation by inhibiting an inhibition region of the detection surface from receiving the input operation for the predetermined period of time if it is determined that the object coming close to the detection surface is the palm.

3. The electrostatic input device according to claim 2, wherein the microcomputer stops inhibiting the reception of the input operation if another input operation is performed on the detection surface other than the inhibition region thereof.

4. The electrostatic input device according to claim 1, wherein the microcomputer sets a plurality of specific regions on the detection surface and determines, for each of the plurality of specific regions, if the object coming close to the detection surface is the palm, and inhibits the reception of the input operation by inhibiting a corresponding inhibition region of the detection surface from receiving the input operation for the predetermined period of time if it is determined, for one of the plurality of specific regions, that the object coming close to the detection surface is the palm.

5. An electrostatic input device comprising:
a detection surface configured to receive an input operation of an object approaching thereto, the detection surface including at least one specific region set at an end of the detection surface; and
a plurality of electrodes, electrostatic capacitances being generated between the plurality of electrodes and the object when the object comes close to the detection surface,
wherein the electrostatic input device is installed with a program causing the electrostatic input device to execute the steps of:
  detecting variations in the electrostatic capacitances for the plurality of electrodes;
  determining whether or not there is a touch on the detection surface;
  determining whether or not the touch is the input operation on the at least one specific region of the detection surface if it is determined that there is the touch on the detection surface;
  permitting reception of the input operation by the detection surface if it is determined that the touch is not the input operation on the at least one specific region;
  determining whether the object coming close to the detection surface is a fingertip or a palm on the basis of the detected variations if it is determined that there is no touch on the detection surface; and
  inhibiting the reception of the input operation by the detection surface for a predetermined period of time if it is determined that there is no touch and the object coming close to the detection surface is the palm,
wherein the determining that the object coming close to the detection surface is the palm includes:
  calculating an integrated value of the variations in the electrostatic capacitances formed between the object and the plurality of electrodes for each of the at least one specific region while there is no touch on the detection surface;
  obtaining a moving average of the integrated value of the variations in the electrostatic capacitances for each of the at least one specific region; and
determining that the object is the palm if the moving average of the integrated value exceeds a threshold value.

* * * * *